March 18, 1969

J. L. MILLER 3,432,938

CLOTHES DRYER CONTROL SYSTEM

Filed May 31, 1967

INVENTOR.
James L. Miller

BY

J. C. Evans

ATTORNEY

United States Patent Office 3,432,938
Patented Mar. 18, 1969

3,432,938
CLOTHES DRYER CONTROL SYSTEM
James L. Miller, Dayton, Ohio, assignor to General Motors Corporation, Detroit, Mich., a corporation of Delaware
Filed May 31, 1967, Ser. No. 642,555
U.S. Cl. 34—45
Int. Cl. G21c *13/32, 25/22, 19/00*
2 Claims

ABSTRACT OF THE DISCLOSURE

In preferred form, a drying apparatus control system including main switch means, electronic control means for controlling the operation of main switch means, a pair of feelers, a single button directly electrically connected to a first capacitor and adapted to be carried on the drum for rotation therewith into electrical engagement with the pair of feelers during each revolution and into random contact with articles in the drum, means including a second capacitor for directing a constant charge from one of the feelers to the single button on each drum revolution, capacitive circuit means connected to the other feeler, the single button electrically connecting to the capacitive circuit means on each drum revolution.

---

This invention relates to clothes dryer controllers and more particularly to a control system for directly sensing the moisture content in articles being dried and operable to terminate a drying cycle of operation in the apparatus when a predetermined level of moisture content occurs in the articles being processed.

In order to more accurately terminate a drying cycle of operation in domestic clothes drying apparatus, articles in the apparatus can be contacted directly by a sensing probe to determine the moisture content in the articles actually being tumbled within a tumbling drum component of the drying apparatus. Such arrangements are characterized by having three basic components, namely, a direct moisture sensor usually taking the form of a pair of spaced apart electrodes or probes extending interiorly of the drum of the dryer at spaced apart points therein; a control relay for operating a plurality of energization circuit switches, for example, those controlling the energization of an electrically energizable high temperature resistance element and an energization circuit for an electrical motor operating a drive system to rotate the tumbling drum component of the dryer; and an electronic control module that will respond to a predetermined moisture content in the articles within the drum and be operative to condition the control relay to terminate a drying cycle of operation. A typical system of this type is disclosed in United States Patent No. 2,045,381, issued June 23, 1936, to Elberty.

Typically, the electronic control module includes a switching component, for example, an electrical discharge device such as the cold cathode tube of Elberty and a capacitive circuit for producing a voltage level in the control module of the controller to trigger the discharge device between an on and off state for controlling the energization of the relay controlling coil of the controller. The operation of controlling systems of this type depends upon wet articles randomly contacting the probe and so long as the articles have a moisture content above a predetermined degree they will serve as a conductive path to interrupt a charging circuit to the capacitive circuit in the control module and thereby maintain a control module condition that will prevent operation of the control relay so as to terminate the drying cycle of operation (a phase of operation where both an electric motor and high resistance element may be energized).

In systems of this type, in order to prevent a premature de-energization of the electric motor and heater of the dryer, there must be a predetermined number of strikes of the probes by the wet tumbling articles to assure that the charging circuit to the discharge device controlling capacitor in the control module will be interrupted. To prevent premature termination, a low leakage, high quality capacitor has been used in the capacitive circuit in the control module. This capacitor has been expensive and of large capacity to produce desired RC time to terminating voltage characteristics in the system prior to firing the discharge device.

An object of the present invention is to improve direct moisture sensing dryer control systems of the type including a drum mounted pair of spaced apart probes that directly contact articles being tumbled to condition a control circuit for operating primary energization circuits in a dryer by the provision of means for producing a customer controlled termination of dryer operation including a relay operating capacitive circuit having a low cost capacitor component and a charging circuit including a capacitor and a low current carrying potentiometer and spaced apart feelers that engage a single control button of electrically conductive material on the rotating drum that is in turn electrically connected to a third capacitor on the drum for transferring a charge from the charging circuit to the control relay operating capacitive circuit and wherein the charging circuit capacitor and potentiometer and drum mounted capacitor are selected and operated to direct a periodic low level current pulse to the low cost capacitor so that the dryer is capable of operating for substantial periods wherein wet articles do not contact the single button on the rotatable drum so as to prevent premature termination of a drying phase of operation of the apparatus.

Further objects and advantages of the present invention will be apparent from the following description, reference being had to the accompanying drawings wherein a preferred embodiment of the present invention is clearly shown.

Figure 1:
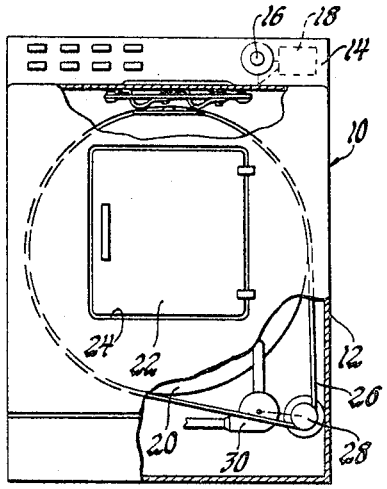
FIGURE 1 is a diagrammatic view of a domestic electric dryer including the present invention.

Referring now to FIGURE 1, a domestic dryer 10 is illustrated including an outer cabinet 12 having a rearwardly located control panel 14 thereon on which is located a control knob 16 of an automatic dryness control system 18. The dryness control system 18 controls rotation of a tumbling drum 20 located within the outer cabinet 12 and to which access is provided through a vertically hinged front door 22 for closing a loading port 24 to the interior of the tumbling drum 20. In the illustrated embodiment, the tumbling drum is driven by a belt pulley drive system 26 including an electric drive motor 28 that is operatively connected to a blower 30 for drawing air through the interior of the tumbling drum 20 and across a suitable heat source such as electrically energized high temperature resistance element (not shown). A typical air flow circuit and electrical resistance heating unit in a domestic dryer are more specifically set forth in United States Patent No. 3,099,542, reference to which may be had for a better understanding of these details which form no part of the present invention.

Figure 2:
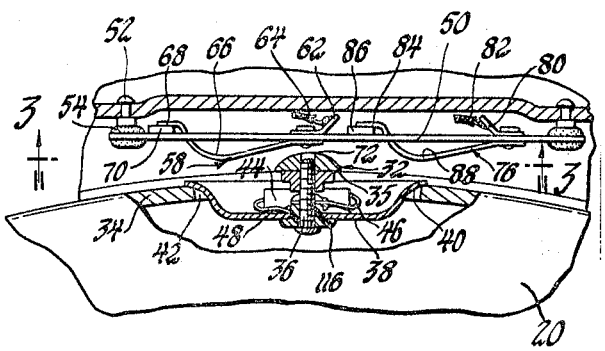
FIGURE 2 is an enlarged fragmentary vertical sectional view of a feeler and article sensing probe in the combination.

The dryness control system 18 more particularly is of the type that includes an electrical charge receiving device 32 secured on the outer periphery 34 of the drum 20 as best seen in FIGURE 2. The charge receiving device 32 includes an electrically conductive metallic button 35 secured by a screw 36 to an electrically conductive, cup-shaped insert member 38 having the periphery 40 thereof secured to the drum periphery 34 at an opening 42 therethrough. Within the cup-shaped insert 38 is located a capacitor 44 that is connected by a lead 46 to the screw 36 ad thence to the electrically conductive button 35. A second lead 48 is electrically connected to the capacitor 44 and to the conductive insert 38 which is in turn electrically connected through the tumbling drum periphery 34 to ground.

Figure 3:
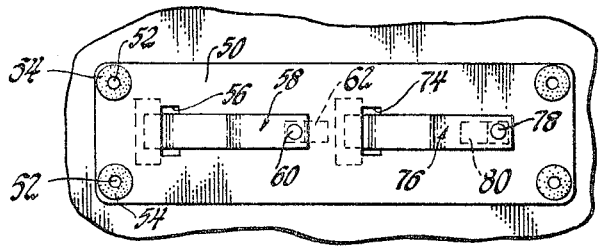
FIGURE 3 is a horizontal sectional view taken along the line 3—3 of FIGURE 2 looking in the direction of the arrows.

The dryness control system 18 further includes a pair of spaced apart feelers which are representatively illustrated as including a plate member 50 secured to the top portion of the exterior cabinet 12 by a mounting post 52 at each corner of the plate member 50, as best seen in FIGURE 3. Each of the mounting posts 52 are electrically insulated from the plate member 50 by a plastic grommet 54 located in surrounding relationship to the post 52 at the plate member 50.

The plate member 50 has a slot 56 in which is located an elongated, electrically conductive feeler strip 58 that has one end thereof secured by a rivet 60 to the plate 50 and to a terminal 62 electrically connected to an electrical lead line 64. The elongated feeler strip 58 includes a bowed segment 66 therein and is spring biased to force a distal end 68 of the strip 58 toward an upper surface of the plate member 50 and thereby cause a damping pad 70 supported on the distal end 68 to be held on the plate member 50 so as to locate the bowed segment 66 of the strip 58 in intersecting relationship with a spherically shaped head 72 of the button 35 on each revolution of the drum with respect to the fixed plate member 50.

Additionally, the plate member 50 includes a second slot 74 therein aligned with the slot 56. A second elongated, electrically conductive feeler strip 76 is located within the slot 74 and has one end thereof fixedly secured by a rivet 78 to the plate 50 and an electrical terminal 80 which connects to an electrical lead line 82. As was the case of the feeler strip 58, the strip 76 includes a distal end 84 thereon on which is mounted a damping pad 86 that is biased by the strip into contact with the plate 50 so as to position a bowed segment 88 of the strip 76 in intersecting engagement with the spherical shaped head 72 of the sensing button 35.

Figure 4:
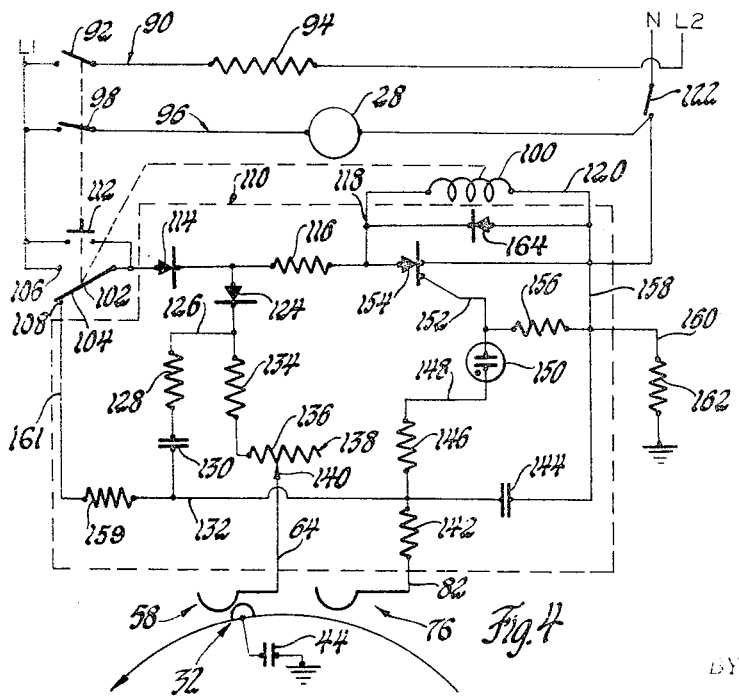
FIGURE 4 is a circuit diagram of a preferred embodiment of the present invention.

Referring now to FIGURE 4, an electrical circuit is illustrated that includes a primary dryer heater energization circuit 90 that runs from wire $L_1$ of a three wire 230 voltage alternating current power source that electrically connects through a relay controlled switch 92 to one end of an electrically energizable resistance heater 94 having the opposite end thereof electrically connected to wire $L_2$ of the power source. Additionally, the illustrated circuit includes a primary drive motor energization circuit 96 from wire $L_1$ through relay controlled switch 98 connected to one side of an electrical drive motor 28 and the opposite side thereof electrically connected to the wire N. In accordance with certain principles of the present invention, the primary energization circuits 90, 96 are maintained under the control of an electrically energizable coil 100 that in addition to operating the switches 92, 98 also operates a single pole double throw switch 102 including an electrically conductive switch blade 104 movable between contacts 106, 108 that will control the energization of module 110 that is electrically connected to the spaced apart feelers 58, 76 and to the power source across wires $L_1$ and N.

When the dryer is initially energized upon depressing a momentary push type start button 112, an electrical circuit is completed from wire $L_1$ through the switch blade 104 of the relay controlled switch 102. Also, current flows through the momentary push button 112 through a first rectifier component 114 that is electrically connected to one end of an electrical resistor 116 having the opposite end thereof electrically connected to a conductor 118 thence to one end of the coil 100 that has the opposite end thereof electrically connected by a conductor 120 thence through a door switch 122 to the neutral wire of the 3-wire source.

Thus, the coil 100 is energized to close switch 92, 98 and thereby complete the heater energization circuit and drive energization circuit 96. Concurrently, the switch blade 104 engages the contact 106 to complete a holding circuit for the coil 100. Following energization, the tumbling drum 20 is operated to cause the single button 32 to rotate in a counterclockwise direction as shown in the drawings into engagement with the feeler strips 58, 76 on each drum revolution.

When the button 32 contacts the feeler strip 58, the drum mounted capacitor 44 is electrically connected to the power source across the control module 110 through a charging circuit from wire $L_1$ through the contact 106, switch blade 104 and rectifier 114 for producing a ½ sine wave DC voltage to operate the coil 100. Part of the ½ sine wave DC voltage from the rectifier 114 passes through a diode 124 thence through a conductor 126 and a resistor 128 to a capacitor 130 which has the opposite side thereof electrically connected to a conductor 132. The resistor 128 and capacitor 130 produce a predetermined constant DC voltage input to one end of a current supplying resistor 134 which has the opposite end thereof connected to the resistance portion 136 of a potentiometer 138 having a movable contact carrying arm 140 operated by control knob 16 and which is electrically connected through the electrical lead 64 to the feeler 58. One feature of the above described charging circuit is that the ½ sine wave DC voltage from the rectifier 114 has its peaks reduced by the capacitor 130 whereby current flow through the resistor 134 to the customer control potentiometer 138 is substantially constant and can be accurately metered by the potentiometer 138, the feeler 58, to the drum capacitor 44.

In addition to the above described charging circuit, during each drum revolution, the single button 34 will pass into electrical engagement with the feeler strip 76 to electrically connect the drum mounted capacitor 44 to a capacitive circuit in the module that runs from feeler strip 76 to electrical lead 82 thence through a resistor 142 that is electrically connected through the conductor 132 to one side of a low cost capacitor 144 of reduced size for controlling the operation of the dryer. The module 110, in addition to relay controlling capacitor 144 includes a trigger circuit from conductor 132 to resistor 146 thence through conductor 148 to one side of a neon lamp 150 that has the opposite side thereof connected to a conductor 152 to the gate of a silicon controlled rectifier 154 that is connected anode to cathode to conductors 118, 120 across the coil 100.

Additionally, the circuit includes a current dissipating branch from the neon tube 150 to a resistor 156 electrically connected to wire N through a conductor 158 and to a ground circuit through a conductor 160 electrically connected to a resistor 162 having the opposite end thereof connected to ground potential.

Representative ratings of components used in the above described circuit are as follows. The silicon controlled rectifier 154 is available from General Electric as GE C106B2. The rectifiers 114, 124 are diodes available from Texas Instruments as IN2070. Neon lamp 150 is a NE72 unit.

| Resistor 116 | ohms | 2,700 |
| Resistor 128 | do | 100 |
| Resistor 134 | do | 1,000 |
| Resistor 136 | megohms | 10 |
| Resistor 142 | ohms | 100 |
| Resistor 146 | do | 10,000 |
| Capacitor 130 | microfarads | .05 |
| Capacitor 44 | do | .05 |
| Capacitor 144 | do | 1 |

Particular attention should be directed to the relative values of the capacitors in the system which are selected to have related charge carrying capacities that reduce the cost of the customer controlling potentiometer in the system while retaining a charge metering rate from the power supply to the drum and thence to the relay controlling capacitor that will result in a prolonged RC time constant in reaching a neon light triggering potential across capacitor 144 even though it is a low cost, small capacitor as compared to the high cost low leakage high quality capacitor previously found in direct sensing dryer control packages.

During normal operation and initial manipulation of momentary push button 112, the coil 100 is energized between wires $L_1$ and N as discussed above to complete a power circuit from wire $L_1$ through the switch 102 having the switch blade 104 thereon in electrical engagement with contact 106. This completes a ½ sine wave DC current supply to coil 100 for maintaining that coil energized so as to close the relay controlled contacts 92, 98 of the heater and motor energization circuits 90, 96, respectively. Additionally, the above-described circuit will provide a constant current supply to the elongated feeler strip 58 which will correspond to a preselected setting on the user control knob 16 which may have suitable indicia thereon indicating a final degree of moisture content that will occur in articles being tumbled and processed within the drum 20 of the apparatus.

By virtue of the provision of the resistor 128 and capacitor 130 of the charging circuit, the potentiometer 138 only has to have a rated current capacity for the averaged voltage supply from the rectifier 114 and diode 124 in the charging circuit. Accordingly, the potentiometer 138 is a low cost component in the system. The charging current from the potentiometer 138 will pass through the feeler strip 58 when the electrical charge receiving device 32 has the button 35 thereof in engagement with bowed segment 66 of strip 58. The momentary contact of these two components as the drum passes through the feeler button will produce a predetermined charging of the capacitor 44, under the control of the user potentiometer 138.

In the illustrated embodiment of the invention, the drum is driven at approximately 50 revolutions per minute causing the wet articles therein to tumble through the interior thereof and periodically contact the interiorly located end of the conductive screw 36 which is electrically insulated from the cup-shaped insert member 38 by ferrule 116. When the articles have a predetermined moisture content, they will conduct electricity from the capacitor 44 to the tumbling drum and thence to ground potential thereby to discharge the rotating tumbling drum supported capacitor 44. Under such conditions, the electrical charge receiving device has the single button in electrical engagement with the elongated feeler strip 76 and will have no current flow to the relay control operating capacitor 144.

It is possible that under certain operating conditions with a certain size load that articles with moisture content above that which is preselected as a predetermined control point by positioning of the control knob 16 will not randomly contact the device 32 to bridge between screw 36 and insert 38 and as a result, the current receiving device 32 will be charged by the feeler 58 and discharged through the feeler 76 thence through the resistor 142 to the capacitor 144. In accordance with certain principles of the present invention, the amount of charging current passing through the potentiometer 138 and feeler 58 to the drum mounted capacitor 44 and the size of the capacitor 44 will reduce current flow to the capacitor 144 so that at least hundreds of revolutions are required before the capacitor 144 is charged sufficiently to produce a potentiometer across the neon bulb 150 sufficient to trigger the SCR 154. This built in delay characteristic of the above-described circuit prevents premature dryer termination as for example when a certain sized wet load is tumbled in a fashion wherein the articles will not bridge the insulation between screw 36 and insert 38 and thereby remove the charge from the revolving capacitor 44.

Following a drying cycle of operation wherein the articles have a moisture content as preset by the control knob 16 the clothes contacting the electric charge receiving device 32 having reduced conductivity so that the charge from the potentiometer 138 and charging feeler 58 mostly pass from the capacitor 44 and through the feeler 76 and resistor 142 to the capacitor 144. Following an extended number of revolutions, as for example, in one working embodiment, at least 200 revolutions of the tumbling drum, a sufficient charge is built up on the capacitor 144 to produce a voltage differential at lamp 150 capable of causing it to discharge and produce a voltage level on the gate of the SCR 154 so that the SCR will be conductive across the anode and cathode to shunt the coil 100 and thereby de-energize the circuit causing the relay control switch 102 to assume the position illustrated in FIGURE 4 and to cause contacts 92, 98 to open. In certain cases, a cooling circuit may be present in a dryer control circuit to maintain the motor 28 energized during a predetermined cool-down period wherein the blower 30 will direct air through the tumbling drum following de-energization from the heater 94.

Following the drying cycle of operation and deenergization of the coil 100, the movable switch blade 104 of the switch 102 will engage the contact 108 to complete a discharge circuit for the capacitor 144 that runs from conductor 132 through a resistor 159 thence through a conductor 161 through the deenergized switch 102 thence through diode 114, resistor 116, coil 100 and conductors 158, 160, resistor 162 to ground.

The charging circuit for the gate of the silicon control rectifier 154 is grounded through resistor 156 and conductor 158 to wire N and the opposite side of the capacitor 144 is grounded through conductor 158, 160 and resistor 162.

A free-wheeling diode 164 is connected between conductors 118 and 120 to maintain coil 100 continuously conditioned to assure closure of switches 92, 98 and 102 during the aforedescribed drying cycles of machine operation.

While the embodiment of the present invention as herein disclosed constitutes a preferred form, it is to be understood that other forms might be adopted.

What is claimed is as follows:

1. In a drying apparatus the combination of a rotatable drum, means for circulating heated air through said drum and for rotating said drum including electrically energizable drive means, an energization circuit for said electrically energizable drive means including line switch means, means for operating said line switch means including an electrically energizable operating component, control circuit means for controlling energization of said energizable line switch operating component including a conductive pick-up button supported on said rotatable drum, a first capacitor on said drum electrically connected to said button, input means for directing a predetermined charge to said first capacitor on each drum revolution including means for rectifying an AC power source to pulsating DC voltage and a second capacitor for storing the pulsating DC voltage to reduce its peak voltage, said input means including a potentiometer for metering current from said second capacitor means to said button on said drum, said control circuit means further including means engageable with said button on each drum revolution for removing current from said first capacitor on said drum and a third capacitor for receiving the predetermined current charge from said button for producing a predetermined voltage differential in said control circuit means, means responsive to said predetermined voltage differential including a three terminal current switching device having two terminals thereon connected in circuit relationship with said electrically energizable line switch operating component to condition said component when the third terminal thereof senses the occurrence of said predetermined voltage differential in said control circuit means to condition said operating component to operate said line switch means.

2. In a drying apparatus the combination of a rotatable drum, means for circulating heated air through said drum and for rotating said drum including electrically energizable drive means, an energization circuit for said electrically energizable drive means including line switch means, means for operating said line switch means including an electrically energizable operating component, control circuit means for controlling energization of said energizable line switch operating component including a conductive, pick-up button supported on said rotatable drum, a first capacitor on said drum electrically connected to said button, input means for directing a predetermined charge to said first capacitor on each drum revolution including means for rectifying an AC power source to pulsating DC voltage and a second capacitor for storing the pulsating DC voltage to reduce its peak voltage, said input means including a potentiometer for metering current from said second capacitor means to said button on said drum, said control circuit means further including means engageable with said button on each drum revolution for removing current from said first capacitor on said drum, and a third capacitor for receiving the predetermined current charge from said button for producing a predetermined voltage differential in said control circuit means, means responsive to said predetermined voltage differential including a three terminal current switching device having two terminals thereon connected in circuit relationship with said electrically energizable line switch operating component to condition said component when the third terminal of said switching device senses the occurrence of said predetermined voltage differential in said control circuit means, conductor means electrically connecting said button and said first capacitor on said drum directly to grounded wet articles tumbling in said drum whereby said wet articles will remove the charge from the first capacitor on said drum during a drying cycle of operation and thereby prevent charging of said first capacitor, said wet articles randomly contacting said conductor means and following a predetermined drying cycle of operation producing an increased electrical resistance path from said button to cause charging of said first capacitor, said predetermined current charge transferred from said first capacitor to said third capacitor on each drum revolution following drying being preselected to charge said third capacitor at a rate allowing hundreds of drum revolutions following drying prior to obtaining said predetermined voltage differential in said control circuit means to terminate a drying cycle of operation.

References Cited

UNITED STATES PATENTS 3,222,798   12/1965   Thornbery et al. _____ 34—45

CARLTON R. CROYLE, *Primary Examiner.*

A. D. HERRMANN, *Assistant Examiner.*

U.S. Cl. X.R.

34—55